US009542142B2

(12) United States Patent
Nakatsu

(10) Patent No.: US 9,542,142 B2
(45) Date of Patent: Jan. 10, 2017

(54) IMAGE FORMING APPARATUS AND DISCHARGE DESTINATION DISPLAY METHOD

(71) Applicant: KYOCERA Document Solutions Inc., Osaka-shi, Osaka (JP)

(72) Inventor: Kenta Nakatsu, Osaka (JP)

(73) Assignee: KYOCERA Document Solutions Inc., Osaka-shi (JP)

(*) Notice: Subject to any disclaimer, the term of this patent is extended or adjusted under 35 U.S.C. 154(b) by 0 days.

(21) Appl. No.: 14/927,344

(22) Filed: Oct. 29, 2015

(65) Prior Publication Data

US 2016/0124692 A1 May 5, 2016

(30) Foreign Application Priority Data

Oct. 31, 2014 (JP) .................. 2014-222666

(51) Int. Cl.
*H04N 1/04* (2006.01)
*G06F 3/12* (2006.01)

(52) U.S. Cl.
CPC .......... *G06F 3/1285* (2013.01); *G06F 3/1207* (2013.01); *G06F 3/1259* (2013.01); *G06F 3/1273* (2013.01)

(58) Field of Classification Search
CPC .... G06F 3/1285; G06F 3/1207; G06F 3/1259; G06F 3/1273
USPC ........................ 358/1.15, 1.9, 474
See application file for complete search history.

(56) References Cited

U.S. PATENT DOCUMENTS

| 8,271,797 B2* | 9/2012 | Araki | G06Q 10/107 705/51 |
| 2015/0070725 A1* | 3/2015 | Monden | G06F 3/1232 358/1.15 |
| 2015/0277809 A1* | 10/2015 | Kim | G06F 3/126 358/1.15 |

FOREIGN PATENT DOCUMENTS

| JP | 2001122501 A | 5/2001 |
| JP | 2003177900 A | 6/2003 |
| JP | 2010214912 A | 9/2010 |
| JP | 2011173348 A | 9/2011 |

* cited by examiner

*Primary Examiner* — Houshang Safaipour
(74) *Attorney, Agent, or Firm* — Alleman Hall McCoy Russell & Tuttle LLP

(57) ABSTRACT

An image forming apparatus includes an inquiry portion, a determination portion, and a discharge destination display portion. The inquiry portion inquires a terminal device as a transmission source of a print job as to whether or not another terminal device exists near a terminal device. The determination portion, when the other terminal device exists, determines whether or not the other terminal device is included in a transmission destination of a print job of a printed matter existing in a discharge destination, based on the present state of a discharge destination. The discharge destination display portion, when the other terminal device is included in the transmission destination of the print job of the printed matter existing in the discharge destination, displays a discharge destination of a printed matter corresponding to the other terminal device, and user identification information of a user who owns the other terminal device.

3 Claims, 7 Drawing Sheets

FIG. 6B

| DISCHARGE DESTINATION | USER IDENTIFICATION INFORMATION | ADDRESS INFORMATION OF TERMINAL DEVICE |
|---|---|---|
| SHEET DISCHARGE TRAY | USER A | 123456789 |
| IN-BODY TRAY | USER B | 234567891 |
| FINISHER TRAY A | USER C | 345678912 |
| ... | ... | ... |

IMAGE FORMING APPARATUS AND DISCHARGE DESTINATION DISPLAY METHOD

INCORPORATION BY REFERENCE

This application is based upon and claims the benefit of priority from the corresponding Japanese Patent Application No. 2014-222666 filed on Oct. 31, 2014, the entire contents of which are incorporated herein by reference.

BACKGROUND

The present disclosure relates to an image forming apparatus and a discharge destination display method. More specifically, the present disclosure relates to an image forming apparatus and a discharge destination display method which enable a user to collectively take printed matters of other users near the user.

There are various conventional arts as image forming apparatuses such as a copy machine, a multifunction peripheral, a printer, and the like, which are shared and used by a plurality of users. For example, as a first related art, a printing device has been known, which performs printing processes upon receiving print jobs that are outputted from a plurality of host devices connected over a network, and include print data and identification information of transmission sources of the print data. This printing device includes a reception portion that receives each print job, a printing portion that executes a printing process on a specified recording medium on the basis of the print data included in each print job, and a count portion that counts the number of discharged recording medium according to the printing process for each print job. The printing device further includes a print job history management table forming portion that stores the count result of the count portion for each transmission source identification information, and a display portion that displays the content of the print job history management table corresponding to a predetermined number of print jobs in a period from the present back to the past. Thereby, even when printed matters are forgotten to be taken and remain on a sheet discharge tray of a printer shared and used by a plurality of users, it is easy to know to whom the printed matters belong, which have been discharged and stacked on top of one another in the sheet discharge tray, on the basis of the user information, the number of sheets to be printed, the sheet size, and the like which are included in the print job.

Meanwhile, as a second related art, an image forming apparatus is known, which discharges an output matter after image formation to an output tray for each job. This image forming apparatus includes a collector detecting portion that detects a collector who has collected the output matter, and a taking-out detecting portion that detects taking-out of the output matter from the output tray. This image forming apparatus further includes: a recording portion that records information indicating the state of the output matter discharged to the output tray, based on information at the discharge of the output matter and information detected by the taking-out detecting portion; and a mixing notification portion that, when the collector detecting portion has detected the collector, determines whether or not the output matter is mixed with another output matter on the output tray on the basis of the information recorded by the recording portion, and, upon determining that the output matters are mixed, notifies the collector of the mixing. Thus, it is possible to avoid erroneous taking-out of an output matter from the output tray due to mixing of output matters, resulting in improved convenience for users and improved security.

Meanwhile, as a third related art, a printer system is known, which includes a client computer that transmits data for printing and a printing instruction, and a printer device that prints a content represented by the data for printing, in accordance with the printing instruction. In this system, the printer device includes a printing history data storage portion that stores therein data indicating a printing history corresponding to each print job. Further, at least one of the client computer and the printer device includes a printing history output instruction input portion, and a printing history output portion that outputs the printing history represented by the printing history data stored in the printing history data storage portion, in accordance with an instruction inputted from the printing history output instruction input portion. Thus, a user is allowed to easily know the printing history.

Meanwhile, as a fourth related art, an image forming apparatus is known, which includes a reception portion that receives a print job, a sheet discharge portion having a bin to which sheets printed based on the print job are discharged, a transmission portion that transmits a print job output completion notification, and a detecting portion that detects whether or not sheets remain in the bin. This image forming apparatus includes a remaining sheet destination specifying portion that specifies the destination of sheets remaining in the bin, a determination portion that, if sheets remain in the bin, determines whether or not the specified destination of the remaining sheets is the same as the destination of the print job, and an output completion notification destination setting portion that, when the specified destination of the remaining sheets is not the same as the destination of the print job, sets the specified destination of the remaining sheets to the transmission destination of an output completion notification. Thereby, it is possible to notify each user that he/she has forgotten to take a printed matter. Thus, the image forming apparatus is useful for avoiding the situation that printed matters directed to a plurality of users are mixed in one bin.

SUMMARY

An image forming apparatus according to an aspect of the present disclosure is communicably connected to a plurality of terminal devices, has a plurality of discharge destination trays, and includes an inquiry portion, a determination portion, and a discharge destination display portion. The inquiry portion, upon receiving a predetermined print job, inquires a terminal device as a transmission source of the print job as to whether or not another terminal device exists near the terminal device. The determination portion, when the result of the inquiry is that the other terminal device exists, determines whether or not the other terminal device is included in a transmission destination of a print job of a printed matter existing in a discharge destination, based on the present state of the discharge destination. The discharge destination display portion, when the result of the determination is that the other terminal device is included in the transmission destination of the print job of the printed matter existing in the discharge destination, displays a discharge destination of a printed matter corresponding to the other terminal device, and user identification information of a user who owns the other terminal device.

A discharge destination display method according to another aspect of the present disclosure is a discharge destination display method of an image forming apparatus communicably connected to a plurality of terminal devices and having a plurality of discharge destination trays, and the method includes a first step, a second step, and a third step. In the first step, when a predetermined print job is received, a terminal device as a transmission source of the print job is inquired as to whether or not another terminal device exists near the terminal device. In the second step, when the result of the inquiry is that the other terminal device exists, it is determined whether or not the other terminal device is included in a transmission destination of a print job of a printed matter existing in a discharge destination, based on the present state of the discharge destination. In the third step, when the result of the determination is that the other terminal device is included in the transmission destination of the print job of the printed matter existing in the discharge destination, a discharge destination of a printed matter corresponding to the other terminal device and user identification information of a user who owns the other terminal device are displayed.

This Summary is provided to introduce a selection of concepts in a simplified form that are further described below in the Detailed Description with reference where appropriate to the accompanying drawings. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 6B is a diagram showing an example of a table according to the embodiment of the present disclosure.

DETAILED DESCRIPTION

Hereinafter, with reference to the accompanying drawings, an embodiment of an image forming apparatus according to the present disclosure will be described for the understanding of the present disclosure. It should be noted that the following embodiment is a specific example of the present disclosure, but does not limit the technical scope of the present disclosure. The alphabetical letter "S" before the numbers in a flowchart means "step".

<Image Forming Apparatus>

Hereinafter, as an image forming apparatus according to the embodiment of the present disclosure, an image forming apparatus having a plurality of sheet feed cassettes will be described.

Figure 1:
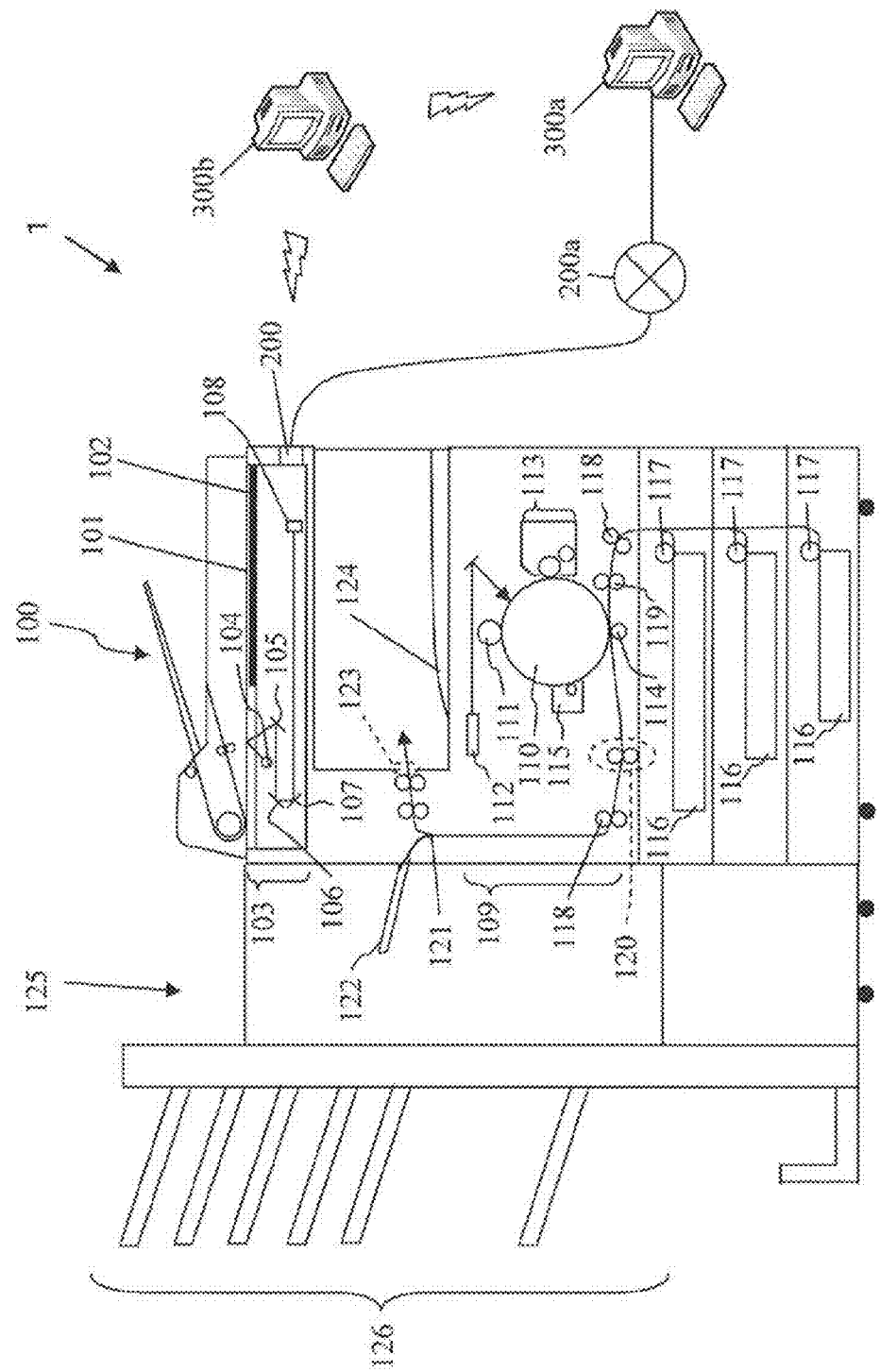
FIG. 1 is a schematic diagram of a multifunction peripheral according to an embodiment of the present disclosure.

FIG. 1 is a schematic diagram of an image forming apparatus according to the embodiment of the present disclosure. However, the details of parts which do not directly-relate to the present disclosure are omitted. The image forming apparatus of the present disclosure corresponds to, for example, a multifunction peripheral including functions of a copier, a scanner, a printer, and the like, and functions as an image forming apparatus having a copy function, a scanner function, a printer function, and the like.

Hereinafter, for example, an operation of a multifunction peripheral (MFP) 100 when a user uses the copy function will be briefly described.

First, when the user uses the multifunction peripheral 100, the user places a document sheet on a document sheet table 101 provided on an upper surface of a housing portion. Then, by using an operation portion 102 (an operation panel) provided near the document sheet table 101, the user inputs a setting condition regarding image processing through an operation screen of the operation portion 102. When the user presses a start key provided in the operation portion 102, the multifunction peripheral 100 starts image processing (copy function, printing process).

Next, in an image reading portion 103, light emitted from a light source 104 is reflected on the document sheet placed on the document sheet table 101. The reflected light is guided to an image sensor 108 by mirrors 105, 106, and 107. The guided light is photoelectrically converted by the image sensor 108, and image data corresponding to the document sheet is generated.

An image forming portion 109 is a portion that forms a toner image on the basis of the image data. The image forming portion 109 includes a photosensitive drum 110. The photosensitive drum 110 rotates in a predetermined direction at a constant speed. Around the photosensitive drum 110, a charging device 111, an exposure unit 112, a developing device 113, a transfer device 114, a cleaning unit 115, and the like are arranged in order from the upstream side of the rotational direction.

The charging device 111 uniformly charges the surface of the photosensitive drum 110. The exposure unit 112 irradiates the surface of the charged photosensitive drum 110 with laser based on the image data to form an electrostatic latent image. The developing device 113 applies toner onto the formed electrostatic latent image to form a toner image. The formed toner image is transferred onto a recording medium (e.g., a paper or a sheet) by the transfer device 114. The cleaning unit 115 removes excess toner remaining on the surface of the photosensitive drum 110. This series of processes is performed by the rotation of the photosensitive drum 110.

The sheet is conveyed from any of a plurality of sheet feed cassettes 116 provided in the multifunction peripheral 100. When conveyed, the sheet is pulled out of one of the sheet feed cassettes 116 into a conveyance path by a pick-up roller 117. The sheet feed cassettes 116 contain sheets of different paper types and each feed a sheet on the basis of setting conditions regarding image processing.

The sheet pulled out into the conveyance path is fed to between the photosensitive drum 110 and the transfer device 114 by conveying rollers 118 or registration rollers 119. The toner image is transferred onto the fed sheet by the transfer device 114, and the sheet is conveyed to a fixing device 120.

When the sheet onto which the toner image has been transferred is passed through between a heating roller and a pressure roller provided in the fixing device 120, heat and pressure are applied to the toner image, thereby fixing a visible image on the sheet. The amount of heat of the heating roller is optimally set in accordance with the paper type, whereby the fixing is appropriately performed. After the visible image has been fixed on the sheet and the image formation has ended, the sheet is guided to a path switching portion 121 by conveying the rollers 118.

At the path switching portion 121, on the basis of a switching instruction by the multifunction peripheral 100, the sheet is guided to a sheet discharge tray 122 provided at a side surface of the housing portion, or is guided via a sheet discharge port 123 to an in-body tray 124 provided in a body of the housing portion. The sheet is placed and accommodated in the sheet discharge tray 122 or the in-body tray 124.

If the sheet discharge tray 122 is detached and an external finisher 125 is connected to a side surface of the multifunction peripheral 100, it is possible to select any of a plurality of trays 126 included in the finisher 125, as a tray to which the sheet is discharged. Through the above-mentioned procedure, the multifunction peripheral 100 provides the user with the copy function.

The multifunction peripheral 100 of the present disclosure is able to perform wired communication with a terminal device 300a connected to a network 200a via a communication portion 200, and perform wireless communication with a terminal device 300b capable of short range wireless communication by using short range wireless communication of the communication portion 200. The multifunction peripheral 100 of the present disclosure is also able to receive a print job including image data and a setting condition from the terminal device 300a or 300b by wired or wireless communication, and execute image formation based on the print job. Further, the terminal devices 300a and 300b are able to mutually exchange information by using the network 200a or its own short range wireless communication (described later).

Figure 2:
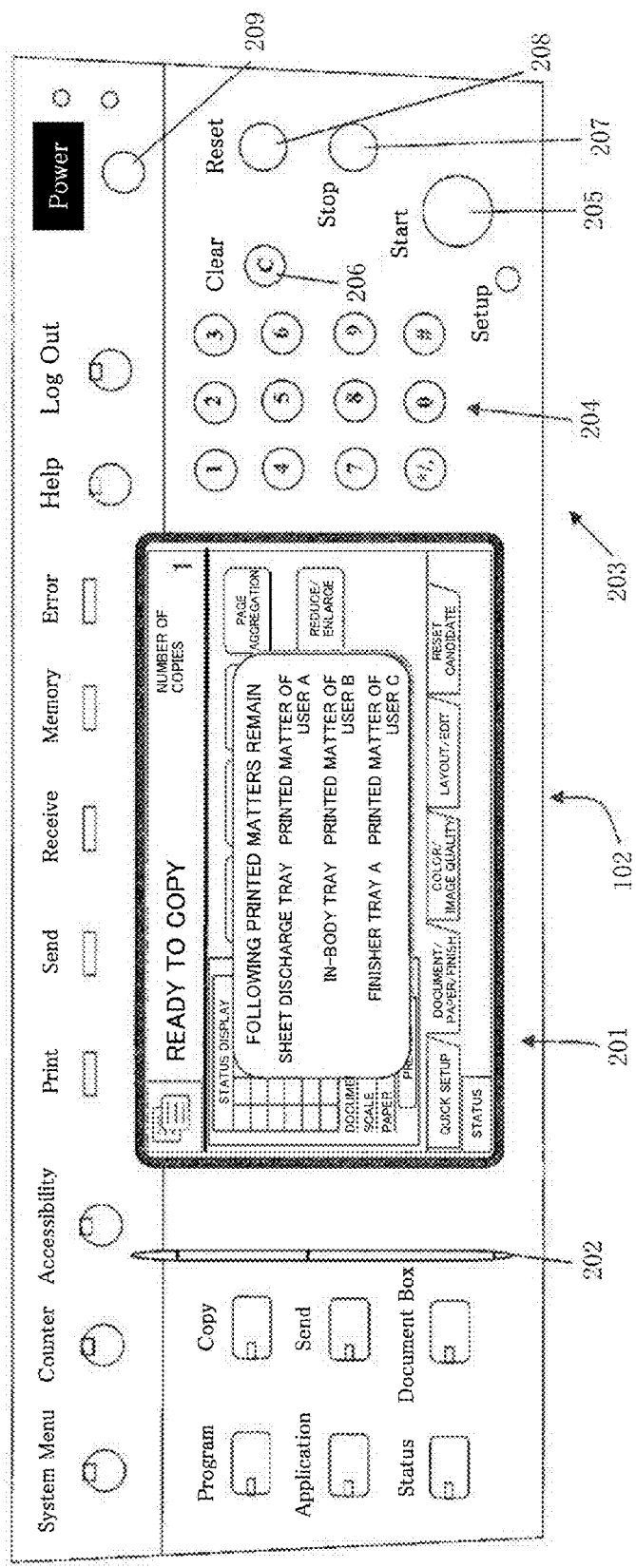
FIG. 2 is a conceptual diagram showing the overall configuration of an operation portion according to the embodiment of the present disclosure.

FIG. 2 is a conceptual diagram showing the overall configuration of the operation portion according to the embodiment of the present disclosure. Using the operation portion 102, the user inputs a setting condition as described above and confirms the inputted setting condition. To input the setting condition, a touch panel 201 (an operation panel), a touch pen 202, and operation keys 203 provided in the operation portion 102 are used.

The touch panel 201 has a function of inputting setting conditions and a function of displaying the setting conditions. In other words, when a key in a screen displayed on the touch panel 201 is pressed, a setting condition corresponding to the pressed key is inputted.

A display portion (not shown) such as an LCD (Liquid Crystal Display) is provided on the back surface of the touch panel 201, and the display portion displays an operation screen such as an initial screen. The touch pen 202 is provided near the touch panel 201. When the user brings the tip of the touch pen 202 into contact with the touch panel 201, a sensor provided under the touch panel 201 detects the location of the contact.

Furthermore, a predetermined number of operation keys 203 are provided near the touch panel 201. For example, a numerical keypad 204, a start key 205, a clear key 206, a stop key 207, a reset key 208, and a power key 209 are provided.

Figure 3:
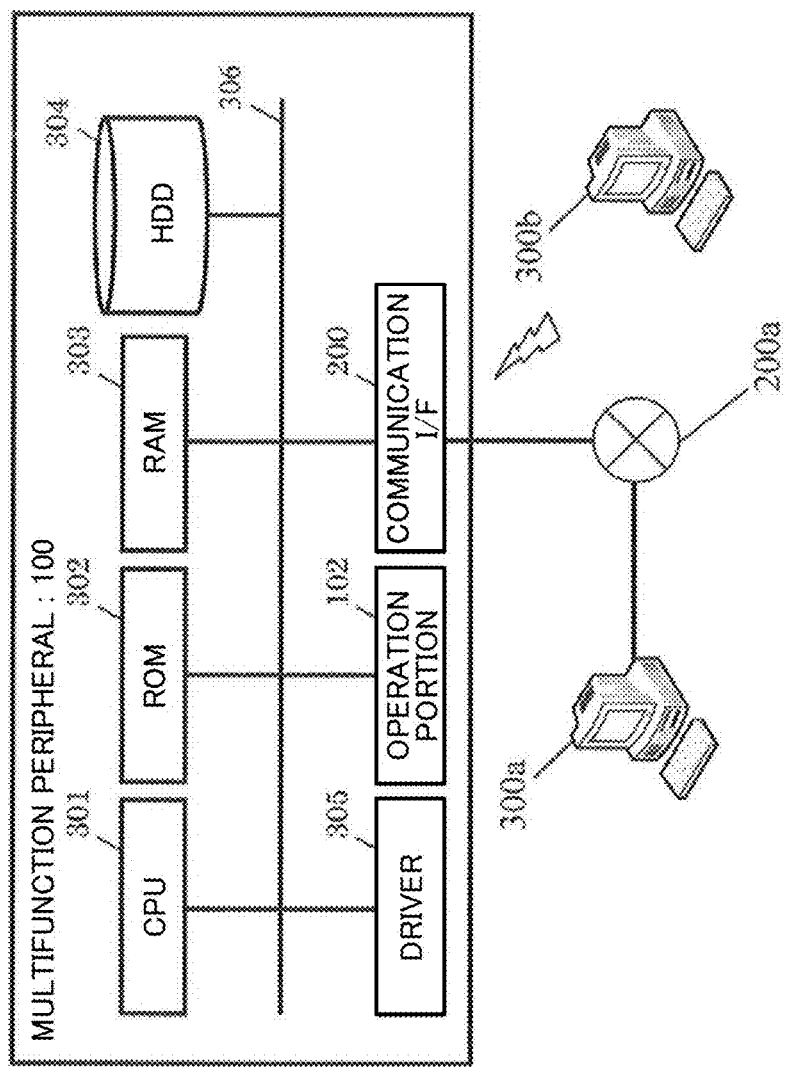
FIG. 3 is a diagram showing the configuration of control system hardware of the multifunction peripheral according to the embodiment of the present disclosure.

Next, the configuration of control system hardware of the multifunction peripheral 100 will be described with reference to FIG. 3. FIG. 3 is a diagram showing the configuration of the control system hardware of the multifunction peripheral 100 according to the present disclosure. However, the details of each portion which is not directly related to the present disclosure are omitted.

In a control circuit of the multifunction peripheral 100, a CPU (Central Processing Unit) 301, a ROM (Read Only Memory) 302, a RAM (Random Access Memory) 303, an HDD (Hard Disk Drive) 304, a driver 305 corresponding to each driving portion, the operation portion 102, and the communication portion 200 are connected to each other via an internal bus 306.

Using, for example, the RAM 303 as a work area, the CPU 301 executes a program stored in the ROM 302, the HDD 304, or the like, receives data or an instruction, a signal corresponding to a key, a command, or the like from the driver 305, the operation portion 102, and the communication portion 200 on the basis of the result of the execution, and controls operation of each driving portion shown in FIG. 1.

In addition, the communication portion 200 performs wired communication with the terminal device 300a over the network 200a, and performs wireless communication with the terminal device 300b capable of short range wireless communication. The terminal devices 300a and 300b each correspond to, for example, a desktop terminal device, a tablet terminal device, a notebook computer, a smartphone, or a mobile terminal device. The wireless communication corresponds to short range wireless communication such as wireless communication utilizing an IC tag, Bluetooth, or infrared ray communication.

Furthermore, regarding later-described portions (shown in FIG. 4) other than the above-described driving portions, each of these portions is also implemented by the CPU 301 executing a program. The ROM 302, the HDD 304, or the like stores, therein, a program and data for implementing each portion described later.

By the way, in the first related art described above, a user corresponding to a printed matter remaining in the printing device can be determined, but whether or not the user is a neighboring other user cannot be determined. Further, in the second related art, mixing of a printed matter of another user can be determined, but whether or not the mixing printed matter belongs to a neighboring other user cannot be determined. Further, in the third related art, the history of printing can be known, but whether or not the printing belongs to a neighboring other user cannot be determined. Further, in the fourth related art, mixing of jobs can be avoided by an output completion notification, but whether or not printed matters of the jobs belong to neighboring other users cannot be determined.

On the other hand, regarding the image forming apparatus shared and used by a plurality of users as described above, the place where the image forming apparatus is installed is usually far from the positions of seats or terminal devices of users who transmit print jobs. In this case, a user who has transmitted a print job walks to the installation place of the image forming apparatus that has executed the print job, to take a printed matter outputted from the image forming apparatus. In this case, it takes time from when the user transmits the print job to when the user takes the printed matter. If the user, who has transmitted the print job and moved to the image forming apparatus, recognizes that a printed matter of another user near this user remains in the image forming apparatus, this user can collectively take all the printed matters and distribute the printed matters. Thus, it may be possible to enhance the work efficiency of the neighboring other user. On the other hand, the multifunction peripheral 100 of the present disclosure enables a user to collectively take all printed matters of other users near the user.

<Embodiment of Present Disclosure>

Figure 4:
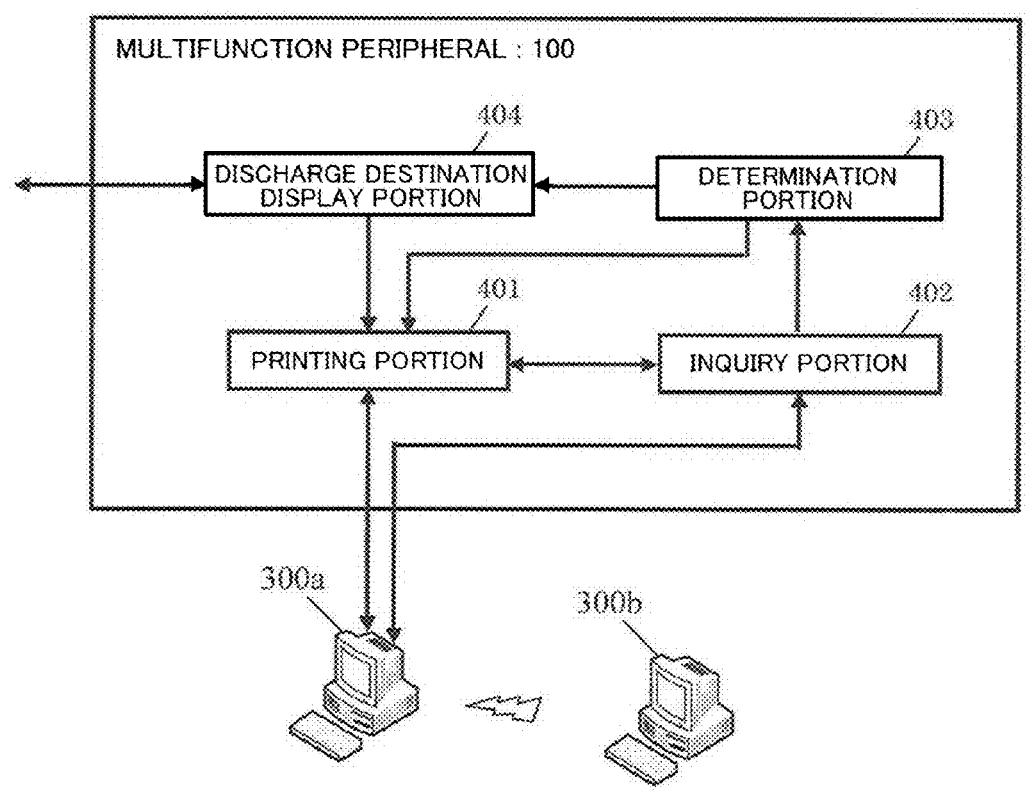
FIG. 4 is a functional block diagram of the multifunction peripheral according to the embodiment of the present disclosure.
Figure 5:
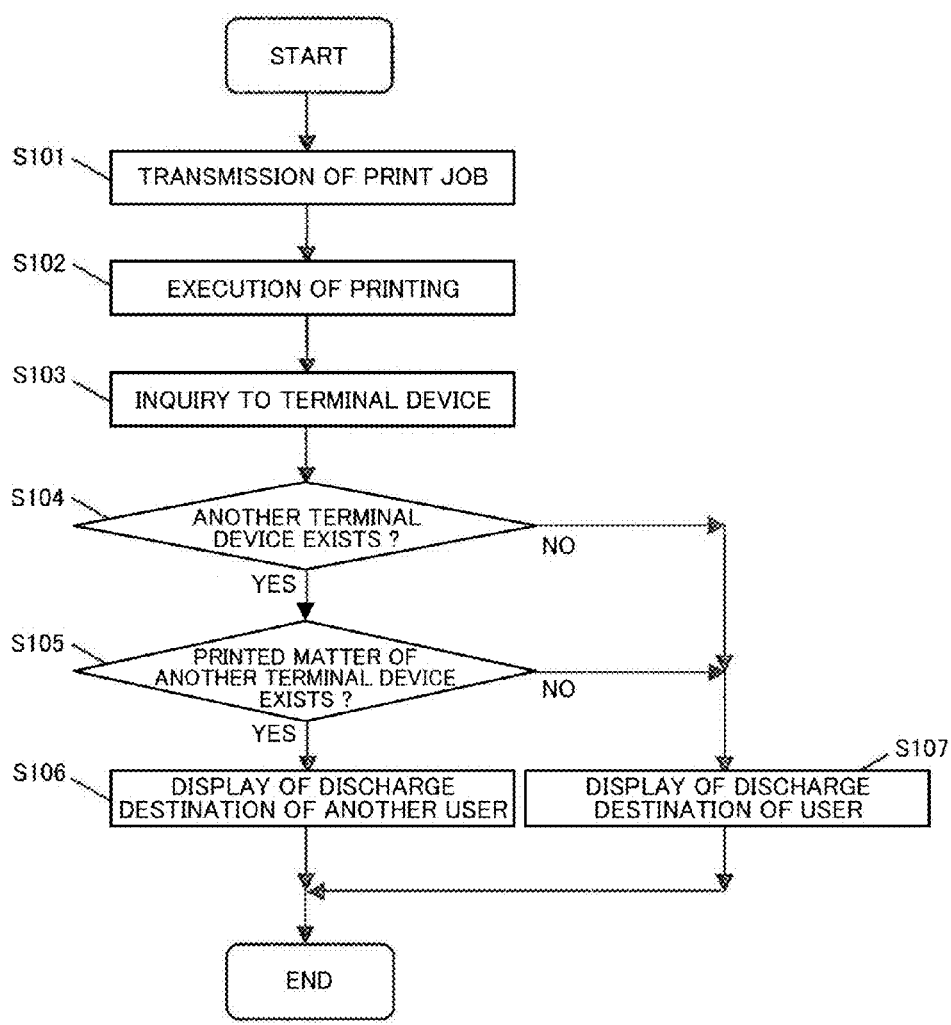
FIG. 5 is a flowchart showing an execution procedure according to the present disclosure.

Next, a configuration and an execution procedure according to the embodiment of the present disclosure will be described with reference to FIGS. 4 and 5. FIG. 4 is a functional block diagram of the multifunction peripheral according to the present disclosure. FIG. 5 is a flowchart showing the execution procedure according to the present disclosure.

First, a predetermined user (user A) forms, by using his/her own terminal device 300a, a print job including image data and a setting condition (e.g., sheet discharge destination "sheet discharge tray"), and transmits this print job to the multifunction peripheral 100 communicably connected to the terminal device 300a in a wired or wireless manner (FIG. 5: S101). Then, a printing portion 401 of the multifunction peripheral 100 obtains address information (e.g., MAC address, "123456789") of the terminal device 300a, receives the print job, and executes printing based on the print job (FIG. 5: S102).

When executing the printing, the printing portion 401 forms a toner image based on the image data of the print job, transfers the toner image onto a sheet designated by the setting condition to form a printed matter, and discharges the printed matter to the sheet discharge destination ("sheet discharge tray") designated by the setting condition.

When executing the printing, the printing portion 401 notifies the inquiry portion 402 of that fact. Upon receiving the notification, the inquiry portion 402 inquires the terminal device 300a, which is the transmission source of the print job, as to whether or not another terminal device 300b exists near (in the neighborhood of) the terminal device 300a (FIG. 5: S103).

Figure 6A:
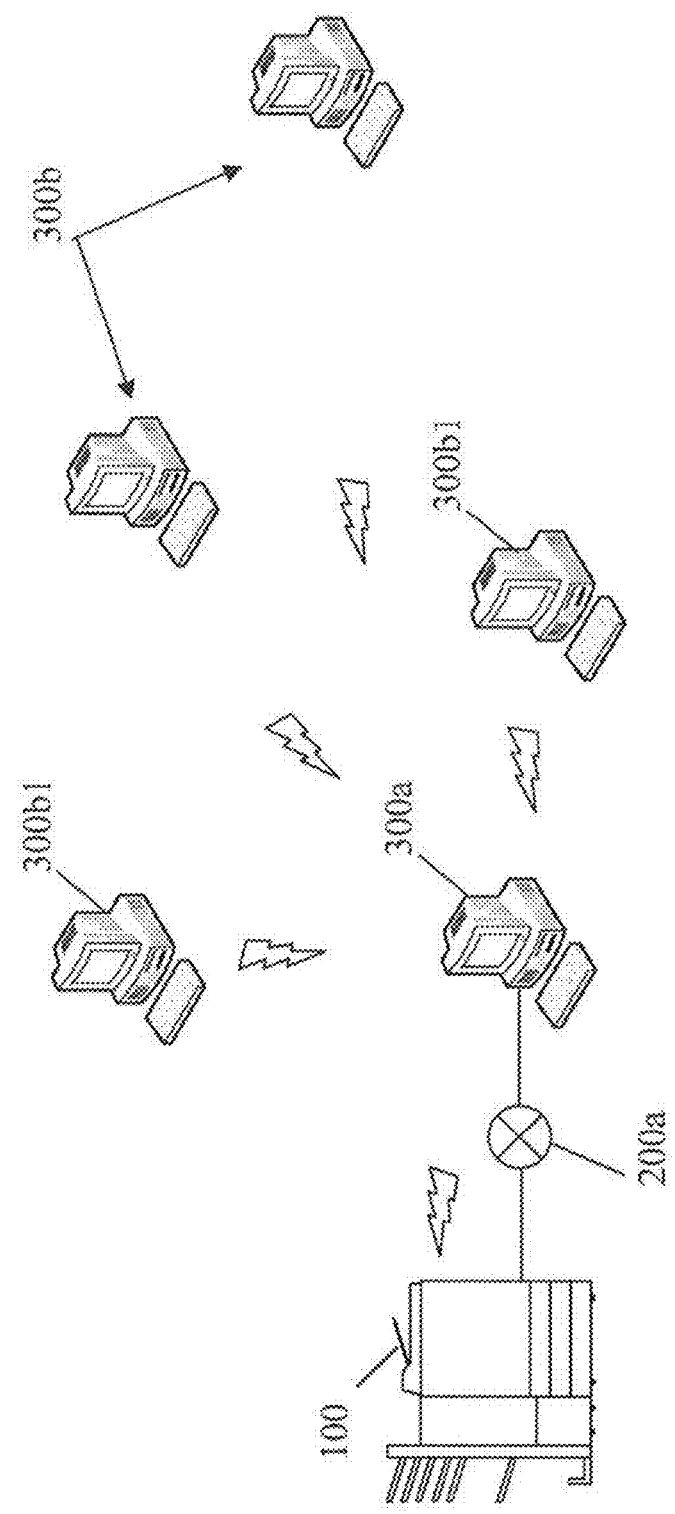
FIG. 6A is a diagram showing the relationship between a multifunction peripheral, a terminal device, and other terminal devices according to the embodiment of the present disclosure.

The inquiry portion 402 may perform the inquiry in any method. An example of an inquiry method is as follows. That is, as shown in FIG. 6A, the inquiry portion 402 instructs the terminal device 300a, which is the transmission source of the just received print job, to communicate with other terminal devices 300b near the terminal device 300a. Upon receiving the instruction, the terminal device 300a communicates with neighboring other terminal devices 300b in a wired or wireless manner to inquire whether or not other terminal devices 300b exist.

The terminal device 300a may inquire for other terminal devices 300b as follows. That is, for example, the terminal device 300a transmits a signal (command) for confirming existence of neighboring other terminal devices 300b by using wireless communication or wired communication. Each of other terminal devices 300b, which has received this signal, returns its own address information (e.g., MAC address) to the terminal device 300a.

The terminal device 300a may inquire for only other terminal devices 300b existing near the terminal device 300a by using short range wireless communication or a local network of wired communication, for example.

When the terminal device 300a has made such inquiry for other terminal devices 300b, predetermined other terminal devices 300b1 return their own address information (e.g., "234567891", "345678912") to the terminal device 300a. Upon receiving the address information of the other terminal devices 300b1, the terminal device 300a notifies the inquiry portion 402 of that fact. Upon receiving the notification, the inquiry portion 402 receives the address information of the other terminal devices 300b1 from the terminal device 300a to determine that other terminal devices 300b exist near the terminal device 300a.

In addition, while the terminal device 300a inquires for neighboring other terminal devices 300b, the inquiry portion 402 of the multifunction peripheral 100 measures an elapsed time from when the inquiry portion 402 transmits the instruction to the terminal device 300a, and determines whether or not the elapsed time exceeds a given set time (e.g., several minutes, several tens minutes, etc.). When the result of the determination is that the elapsed time does not exceed the set time, the inquiry portion 402 repeats the determination until the elapsed time exceeds the set time. Thus, the inquiry portion 402 receives the address information of the other terminal devices 300b1 from the terminal device 300a within the given set time, whereby the inquiry portion 402 is allowed to regard the other terminal devices 300b1 as neighboring other terminal devices 300b.

The set time is not particularly limited. For example, the set time may be a predetermined time required from when printing corresponding to the print job is started to when the printing is ended, or a predetermined time required from when the user (user A) of the terminal device 300a transmits the print job to when the user goes to the multifunction peripheral 100.

When the result of the determination is that the elapsed time exceeds the set time, the inquiry portion 402 ends the inquiry, and determines whether or not other terminal devices 300b exist (FIG. 5: S104).

When the result of the determination is that address information ("234567891", "345678912") of other terminal devices 300b1 have been received from the terminal device 300a and therefore other terminal devices 300b exist (FIG. 5: YES in S104), the inquiry portion 402 notifies a determination portion 403 of that fact. Upon receiving the notification, the determination portion 403, based on the present states of the discharge destinations, determines whether or not the other terminal devices 300b1 are included in the transmission destinations of the print jobs of the printed matters existing in the discharge destinations (FIG. 5: S105).

The determination portion 403 may perform the determination in any method. For example, the determination may be made as follows. That is, the determination portion 403 communicates with the printing portion 401 to obtain the present states of the discharge destinations.

As shown in FIG. 6B, the printing portion 401 temporarily retains, as a table 600, the present states of the discharge destinations. In the table 600, discharge destination item 601 representing the discharge destinations (the sheet discharge tray 122, the in-body tray 124, and the plurality of trays 126 when the finisher 125 is connected) of the multifunction peripheral 100, user identification information 602 (e.g., user names such as "user A", "user B", etc.) of users who have transmitted the print jobs of the printed matters discharged to the discharge destinations, and address information 603 (e.g., "123456789", "234567891", etc.) of the terminal devices 300 owned by the users corresponding to the user identification information 602, are stored in association with each other.

The user identification information 602 and the address information 603 of each terminal device 300 have been registered in a predetermined memory in advance, whereby the user identification information 602 can be uniquely specified from the address information 603 of the terminal device 300.

When the printing portion 401 has received a print job and discharged a printed matter to a discharge destination, the printing portion 401, by using a printed matter detecting sensor provided in each discharge destination in advance, retains, in the table 600, user identification information 602 and address information 603 of the print job corresponding to the printed matter in the discharge destination until the printed matter in the discharge destination is removed. When the printed matter in the discharge destination has been removed, the printing portion 401 deletes the user identification information 602 and the address information 603 of the print job from the table 600. Thus, the printing portion 401 manages the present states of the discharge destinations.

The determination portion 403, with reference to the table 600, compares the address information 603 in the table 600 with the address information 603 of the existing other terminal devices 300b1, and determines whether or not the address information 603 of the existing other terminal devices 300b1 are included in the address information 603 of the table 600.

When the result of the determination is that the address information 603 of the other terminal devices 300b1 are included in the address information 603 of the table 600, the determination portion 403 determines that the other terminal device 300b1 is included in the transmission destination of the print job of the printed matter existing in the discharge destination. That is, in this case, when the user A has transmitted the print job, other users (user B, user C) near the user A have also transmitted their own print jobs, and printed matters corresponding to the print jobs have not yet been taken. Therefore, the determination portion 403 notifies a discharge destination display portion 404 of that fact. Upon receiving this notification, the discharge destination display portion 404 displays the discharge destinations of the printed matters corresponding to the other terminal devices 300b1 and the user identification information of the users who own the other terminal devices 300b1 (FIG. 5: S106).

The discharge destination display portion 404 may perform the display in any method. For example, the display is performed as follows. That is, the discharge destination display portion 404 communicates with the printing portion 401, and obtains, with reference to the table 600, the discharge destinations (e.g., "in-body tray", "finisher tray A", etc.) corresponding to the address information ("123456789", "234567891") of the other terminal devices 300b1, and the user identification information (e.g., "user B", "user C") of the other users who own the other terminal devices 300b1, and then displays a discharge destination screen on the touch panel based on the basis of the obtained information.

As shown in FIG. 2, a predetermined message "following printed matters remain", the discharge destinations ("in-body tray", "finisher tray A") in which the printed matters remain, and the user identification information ("user B", "user C") of the other users corresponding to the printed matters in the discharge destinations, are displayed on the discharge destination screen. In addition, the discharge destination ("sheet discharge tray") corresponding to the user A is also displayed.

Therefore, when the user A who has transmitted the print job goes to the multifunction peripheral 100, the user A is allowed to take his/her own printed matter as well as the printed matters of the other users B and C of the other terminal devices 300b1, by checking the discharge destination screen. Further, since the other terminal devices 300b1 of the other users B and C are located near the terminal device 300a of the user A, the user A is allowed to bring back the printed matters of the other users B and C and easily distribute them to the other users B and C. As the result, the work efficiency as a whole can be enhanced as compared to the case where each user goes to the multifunction peripheral 100 to take his/her own printer matter.

When the user A has taken all the printed matters in the discharge destinations, the discharge destination display portion 404 deletes the discharge destination screen from the touch panel 201 upon detecting, based on the printed matter detection sensor of the multifunction peripheral 100, that all the printed matters in the respective discharge destinations have been removed.

On the other hand, when there is no response from another terminal device 300b in step S104, for example, when another terminal device 300b is located at a distance considerably far away from the terminal device 300a and therefore a response from the other terminal device 300b is delayed or when another terminal device 300b is powered off, the inquiry portion 402, based on the result of the determination, determines that another terminal device 300b does not exist (FIG. 5: NO in S104). In this case, the inquiry portion 402 ends the processing, and notifies the discharge destination display portion 404 of that fact. Upon receiving the notification, the discharge destination display portion 404 displays a discharge destination screen representing the discharge destination ("sheet discharge tray") of the user A on the touch panel 201. Thus, the user A takes only his/her own printed matter.

When the result of the determination in step S105 is that the address information 603 of the other terminal device 300b1 does not exist in the address information 603 of the table 600, the determination portion 403 determines that the other terminal device 300b1 is not included in the transmission destination of the print job of the printed matter existing in the discharge destination, and notifies the discharge destination display portion 404 of that fact. Upon receiving the notification, the discharge destination display portion 404 displays a discharge destination screen representing the discharge destination ("sheet discharge tray") of the user A on the touch panel 201. Thus, the user A takes only his/her own printed matter.

As described above, the image forming apparatus of the present disclosure is characterized to include: the inquiry portion 402 that, upon receiving a predetermined print job, inquires a terminal device as a transmission source of the print job as to whether or not another terminal device exists near the terminal device; the determination portion 403 that, when the result of the inquiry is that another terminal device exists, determines whether or not the other terminal device is included in a transmission destination of a print job of a printed matter existing in a discharge destination, based on the present state of the discharge destination; and a discharge destination display portion 404 that, when the result of the determination is that the other terminal device is included in the transmission destination of the print job of the printed matter existing in the discharge destination, displays a discharge destination of a printed matter corresponding to the other terminal device 300b1 and user identification information of a user who owns the other terminal device 300b1. Thus, a user is allowed to collectively take printed matters of neighboring other users.

In the embodiment of the present disclosure, the multifunction peripheral 100 includes all the portions. However, the present disclosure may be configured such that a program for implementing all the portions is stored in a non-transitory computer-readable storage medium, and the storage medium may be provided. In this configuration, the image forming apparatus is caused to read the program, whereby the image forming apparatus implements all the portions. In this case, the program itself read from the storage medium provides the function and effect of the present disclosure. Further, the present disclosure may be also provided as a method of storing, in a hard disk, the steps to be executed by all the portions. That is, the present disclosure may be provided as a program to be executed by a computer, which is individually distributed over a telecommunication line or the like. In this case, a central processing unit (CPU) implements a control operation in accordance with the program of the present disclosure and in corporation with the circuits other than the CPU. Alternatively, all the portions implemented by using the program and the CPU may be configured by using dedicated hardware. Further, the program may be stored in a non-transitory computer-readable storage medium such as a CD-ROM and distributed.

As described above, the image forming apparatus and the discharge destination display method according to the present disclosure are useful as an image forming apparatus having a plurality of trays as discharge destinations, such as a multifunction peripheral, a copy machine, or a printer, and a discharge destination display method of the image forming apparatus, and are effective as an image forming apparatus and a discharge destination display method which enable a user to collectively take printed matters of neighboring other users.

It is to be understood that the embodiments herein are illustrative and not restrictive, since the scope of the disclosure is defined by the appended claims rather than by the description preceding them, and all changes that fall within metes and bounds of the claims, or equivalence of such metes and bounds thereof are therefore intended to be embraced by the claims.

The invention claimed is:

1. An image forming apparatus communicably connected to a plurality of terminal devices, and having a plurality of discharge destination trays, comprising:
   an inquiry portion configured to, upon receiving a predetermined print job, inquire a terminal device as a transmission source of the print job as to whether or not another terminal device exists near the terminal device;
   a determination portion configured to, when the result of the inquiry is that the other terminal device exists, determine whether or not the other terminal device is included in a transmission destination of a print job of a printed matter existing in a discharge destination, based on the present state of the discharge destination; and
   a discharge destination display portion configured to, when the result of the determination is that the other terminal device is included in the transmission destination of the print job of the printed matter existing in the discharge destination, display a discharge destination of a printed matter corresponding to the other terminal device, and user identification information of a user who owns the other terminal device, wherein
   the inquiry portion determines that another terminal device exists, upon receiving information of the other terminal device from the terminal device as the transmission source, within a given set time from when the inquiry portion makes the inquiry to the terminal device as the transmission source.

2. An image forming apparatus communicably connected to a plurality of terminal devices, and having a plurality of discharge destination trays, comprising:
   an inquiry portion configured to, upon receiving a predetermined print job, inquire a terminal device as a transmission source of the print job as to whether or not another terminal device exists near the terminal device;
   a determination portion configured to, when the result of the inquiry is that the other terminal device exists, determine whether or not the other terminal device is included in a transmission destination of a print job of a printed matter existing in a discharge destination, based on the present state of the discharge destination; and
   a discharge destination display portion configured to, when the result of the determination is that the other terminal device is included in the transmission destination of the print job of the printed matter existing in the discharge destination, display a discharge destination of a printed matter corresponding to the other terminal device, and user identification information of a user who owns the other terminal device, wherein
   the inquiry portion determines that another terminal device exists, upon receiving address information of the other terminal device from the terminal device as the transmission source,
   based on a table in which discharge destinations, user identification information of users who have transmitted print jobs of printed matters discharged to the discharge destinations, and address information of terminal devices owned by the users of the user identification information are stored in association with each other, the determination portion determines whether or not the received address information of the other terminal device is included in the address information of the terminal devices in the table, and
   when the result of the determination is that the received address information of the other terminal device is included in the address information of the terminal devices in the table, the discharge destination display portion obtains, from the table, a discharge destination and user identification information corresponding to the address information of the other terminal device, and displays the discharge destination of the printed matter corresponding to the other terminal device and the user identification information of the user who owns the other terminal device.

3. A discharge destination display method of an image forming apparatus communicably connected to a plurality of terminal devices and having a plurality of discharge destination trays, the method comprising the steps of:
   inquiring, when a predetermined print job is received, a terminal device as a transmission source of the print job as to whether or not another terminal device exists near the terminal device;
   determining, when the result of the inquiry is that the other terminal device exists, whether or not the other terminal device is included in a transmission destination of a print job of a printed matter existing in a discharge destination, based on the present state of the discharge destination; and
   displaying, when the result of the determination is that the other terminal device is included in the transmission destination of the print job of the printed matter existing in the discharge destination, a discharge destination of a printed matter corresponding to the other terminal device, and user identification information of a user who owns the other terminal device, wherein
   in the inquiring step, it is determined that another terminal device exists, upon receiving information of the other terminal device from the terminal device as the transmission source, within a given set time from when the inquiry portion makes the inquiry to the terminal device as the transmission source.

* * * * *